United States Patent [19]
Tsai et al.

[11] Patent Number: 5,644,446
[45] Date of Patent: Jul. 1, 1997

[54] ROTARY-HEAD DIGITAL REPRODUCING/ RECORDING METHOD AND APPARATUS WITH BLOCK ADDRESS-BASED AREA SIGNAL GENERATION

[75] Inventors: Jang-Zern Tsai, Ma Dow Town; Jyh Yuan, Taipei, both of Taiwan

[73] Assignee: Industrial Technology Research Institute, Hsinchu, Taiwan

[21] Appl. No.: 561,787

[22] Filed: Nov. 22, 1995

Related U.S. Application Data

[63] Continuation of Ser. No. 298,841, Aug. 31, 1994, abandoned, which is a continuation of Ser. No. 908,411, Jul. 6, 1992, abandoned.

[51] Int. Cl.⁶ .................................................. G11B 15/18
[52] U.S. Cl. ...................... 360/72.2; 360/13; 360/48; 360/18; 360/62; 386/46; 386/96
[58] Field of Search .................................. 360/72.1, 72.2, 360/75, 72.3, 32, 48, 53, 13, 18, 27, 51, 62, 64; 386/46, 96

[56] References Cited

U.S. PATENT DOCUMENTS

| | | | |
|---|---|---|---|
| 4,486,780 | 12/1984 | Ive | 371/37 X |
| 4,628,372 | 12/1986 | Morisawa | 360/40 |
| 5,021,897 | 6/1991 | Yoshino et al. | 360/72.2 |

OTHER PUBLICATIONS

The DAT Conference Standard, pp. 1–100, Added pp. 1–6, Jun. 1987.

*Primary Examiner*—Andrew L. Sniezek
*Attorney, Agent, or Firm*—Meltzer, Lippe, Goldstein, et al.

[57] ABSTRACT

In digital signal recording/reproducing apparatus, the reproduced signal is utilized to determine the magnetic recording head position on a magnetic track. The reproduced signal is processed to detect any error and to produce a reference signal for the magnetic head to be positioned over the magnetic track, thus accomplishing the function of "after recording".

13 Claims, 8 Drawing Sheets

FIG. 2
(PRIOR ART)
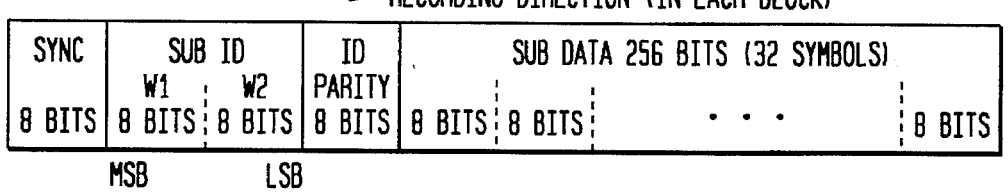
1 DATA BLOCK = 8+8+8+8+8×32 = 288 DATA BITS
(A) SUB AREA BLOCK FORMAT
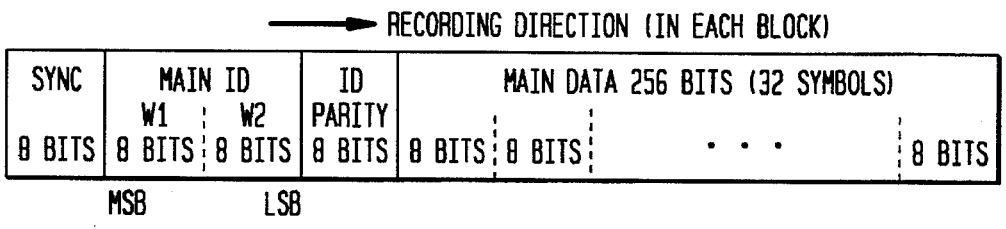
1 DATA BLOCK = 8+8+8+8+8×32 = 288 DATA BITS
(B) PCM AREA BLOCK FORMAT

FIG. 3
(PRIOR ART)

| SUB ID CODE ||||||||||||||||
|---|---|---|---|---|---|---|---|---|---|---|---|---|---|---|---|
| W1 |||||||| W2 ||||||||
| B7 | B6 | B5 | B4 | B3 | B2 | B1 | B0 | B7 | B6 | B5 | B4 | B3 | B2 | B1 | B0 |
| CONTROL ID |||| DATA ID |||| 1 | PACK ID ||| X | X | X | 0 |
| PROGRAM NUMBER ID2 |||| PROGRAM NUMBER ID3 |||| 1 | PROGRAM NO. ID1 ||| X | X | X | 1 |

| PCM ID CODE ||||||||||||||||
|---|---|---|---|---|---|---|---|---|---|---|---|---|---|---|---|
| W1 |||||||| W2 (BLOCK ADDRESS) ||||||||
| B7 | B6 | B5 | B4 | B3 | B2 | B1 | B0 | B7 | B6 | B5 | B4 | B3 | B2 | B1 | B0 |
| FORMAT ID || ID1 || FRAME ADDRESS |||| 0 | X | X | X | 0 | 0 | 0 | 0 |
| SC1 |||||||| 0 | X | X | X | 0 | 0 | 0 | 1 |
| ID2 || ID3 || FRAME ADDRESS |||| 0 | X | X | X | 0 | 0 | 1 | 0 |
| SC2 |||||||| 0 | X | X | X | 0 | 0 | 1 | 1 |
| ID4 || ID5 || FRAME ADDRESS |||| 0 | X | X | X | 0 | 1 | 0 | 0 |
| SC3 |||||||| 0 | X | X | X | 0 | 1 | 0 | 1 |
| ID6 || ID7 || FRAME ADDRESS |||| 0 | X | X | X | 0 | 1 | 1 | 0 |
| SC4 |||||||| 0 | X | X | X | 0 | 1 | 1 | 1 |
| FORMAT ID || ID1 || FRAME ADDRESS |||| 0 | X | X | X | 1 | 0 | 0 | 0 |
| AC1 |||||||| 0 | X | X | X | 1 | 0 | 0 | 1 |
| ID2 || ID3 || FRAME ADDRESS |||| 0 | X | X | X | 1 | 0 | 1 | 0 |
| AC2 |||||||| 0 | X | X | X | 1 | 0 | 1 | 1 |
| ID4 || ID5 || FRAME ADDRESS |||| 0 | X | X | X | 1 | 1 | 0 | 0 |
| AC3 |||||||| 0 | X | X | X | 1 | 1 | 0 | 1 |
| ID6 || ID7 || FRAME ADDRESS |||| 0 | X | X | X | 1 | 1 | 1 | 0 |
| AC4 |||||||| 0 | X | X | X | 1 | 1 | 1 | 1 |

ROTARY-HEAD DIGITAL REPRODUCING/ RECORDING METHOD AND APPARATUS WITH BLOCK ADDRESS-BASED AREA SIGNAL GENERATION

This is a continuation of application Ser. No. 08/298,841 filed Aug. 31, 1994, abandoned which is a continuation of application Ser. No. 07/908,411 filed Jul. 6, 1992 abandoned.

BACKGROUND OF THE INVENTION

In general, magnetic recording/repoducing apparatus utilize the action of a magnetic head. During reproducing, the magnetic head scans a recording medium, records the signal data on the medium, forming magnetic tracks. The digital signals on the magnetic tracks can be of different categories. Depending on the different catagories, a magnetic track can be divided into a number of areas to record different kinds of signals. During reproducing, the magnetic head scans the original recording tracks, and reads the digital signals on these tracks.

In the foregoing recording/reproducing apparatus, there is, in addition to the normal recording and reproducing modes of operation, allowed another "after recording" mode. In the "after recording" mode when the magnetic head scans a recording track, recording action is performed on some of the divided areas while reproducing is performed on other areas. The function of this mode is to "overwite" certain areas with new signals and to retain the signals on some other areas.

In the "after recording" mode, the reproducing apparatus must accurately know the relative positions of the magnetic head and the magnetic track in order to accurately control the timing of the reproducing and the recording actions. In other words, recording action is performed in the "after recording" area, while reproducing action is performed in other areas. If the relative positions of the recording head and the magnetic track are not accurately aligned, the "after recording" area may not be completely, overwritten, while the area not intended for "after recording" may inadvertently be overwritten.

In conventional recording/reproducing apparatus, the relative positions of the recording head and the recording media cannot be accurately controlled. Furthermore, the design of the recording media format does not consider how the recording/reproducing apparatus can learn the relative positions of the magnetic head and the magnetic track. Thus, using conventional recording/reproducing apparatus and traditional magnetic track format for "after recording", one may find it difficult to control accurately the recording/ reproducing function and to overwrite in the designated area.

The foregoing recording/reproducing apparatus is typical of a rotary-head digital audio tape recorder (R-DAT). In a R-DAT, a magnetic head A and a magnetic head B are fixed on a rotating magnetic drum. During rotation, the magnetic heads follow the rotation to scan the magnetic tape. The magnetic head record on the magnetic track, which is at an oblique angle with the running direction of the tape, or reproduce what is recorded on the magnetic tape. The track format of the R-DAT, as shown in FIG. 1, is composed of a SUB-1 area, an ATF-1 area, a PCM area, an ATF-2 area, a SUB-2 area, etc. and the IBG signals between these areas. The SUB-1 and SUB-2 areas are sub-areas for pack data recording. The PCM area is for recording an audio frequency signal after pulse-code modulation. The Sub-areas and PCM area are composed of data blocks. The block formats are shown in FIG. 2. There is a block synchronization signal at the beginning of each block. Following the block synchronization signal, the two bytes W1 and W2 consist of ID (identification) code, frame address and block address, as shown in FIG. 3. In FIG. 2(a), the byte following W1 and W2 is the parity byte of W1 and W2. The ATF-1 and ATF-2 areas are for recording auto track finding signals.

The "after recording" function of the R-DAT is to overwrite the sub-areas of the magnetic tape already occupied with recorded signals, and to maintain the status quo of the original signals in other areas. Alternatively, the PCM area is overwritten and remaining areas are unchanged. During "after recording", the changeover of the recording/ reproducing action is traditionally controlled by two methods:

Method 1: Use a drum phase generator (DPG) signal as a reference to determine the relative positions of the magnetic head and the magnetic tape. The drawback of this method is that the accuracy depends on the mechanical parts and cannot be accurately controlled.

Method 2: Detect certain signals in the ATF areas as a reference to determine the relative positions of the magnetic head and the magnetic track. However, due to the low frequency of the ATF signals, even a few cycles of errors in measurement can cause large resultant error. Besides, the ATF signals have waveforms, and therefore cannot prevent any spurious ATF signals from acting falsely as a reference signal.

The preamble areas, post-amble areas and inter-block gap (IBG) areas, shown in FIG. 1, enclosing the data areas provide the tolerance for the accuracy of overwriting during after-recording using the conventional methods. Nevertheless, the mechanical specification is still limited for the method 1, or the spurious ATF signal still causes serious results when using the method 2.

The drawbacks of the prior art are illustrated, in U.S. Pat. No. 5,021,897 by Yoshino et al and U.S. Pat. No. 4,628,372 by Morisawa. The Yoshino patent corresponds to Method 1. The disadvantage of this method is that the accuracy for the relative position between the magnetic head and the magnetic tape must depend on the mechanical parts used, and cannot be accurately controlled. Morisawa disclosed a method for recording and detecting address code signals to separate program (audio) segments on a magnetic tape. The address code signals are only recorded in the unrecorded positions (blank or silent portions) between two individual program segments in order to distinguish two songs. In Yoshino and Morisawa, due to the low frequency of the ATF signals, even a few cycles of errors in measurement can cause large resultant error. Their ATF signals have waveforms and therefore cannot prevent any spurious ATF signals from acting falsely as a reference.

OBJECTS AND SUMMARY OF THE INVENTION

An object of this invention is implement a method to process signals reliably in a recording/reproducing apparatus. Another object of this invention is to implement a method for accurately and reliably controlling the recording/ reproducing changeover for the "after recording" function. Still another object of this invention is to prevent any spurious auto track finding (ATF) signal from acting falsely as a reference signal.

These objects are achieved in this invention by utilizing the data block structure in the magnetic track of the recording media. When a data area in the recorded track is reproduced, the reproducing apparatus can utilize the reproduced block sequence to determine the relative position of the magnetic head and the recorded track. The result is more accurate than the two foregoing methods because it does not depend on the accuracy of the mechanical parts and the processing can be performed on the time basis of the data bit. Besides, because the data block format is encoded for error detection or correction, the reliability of the result is enhanced.

BRIEF DESCRIPTION OF THE DRAWINGS

FIG. 2 shows the block format of R-DAT.

FIG. 3 shows the contents of the W1 and W2 bytes in FIG. 2.

DETAILED DESCRIPTION OF THE PREFERRED EMBODIMENT

Figure 4:
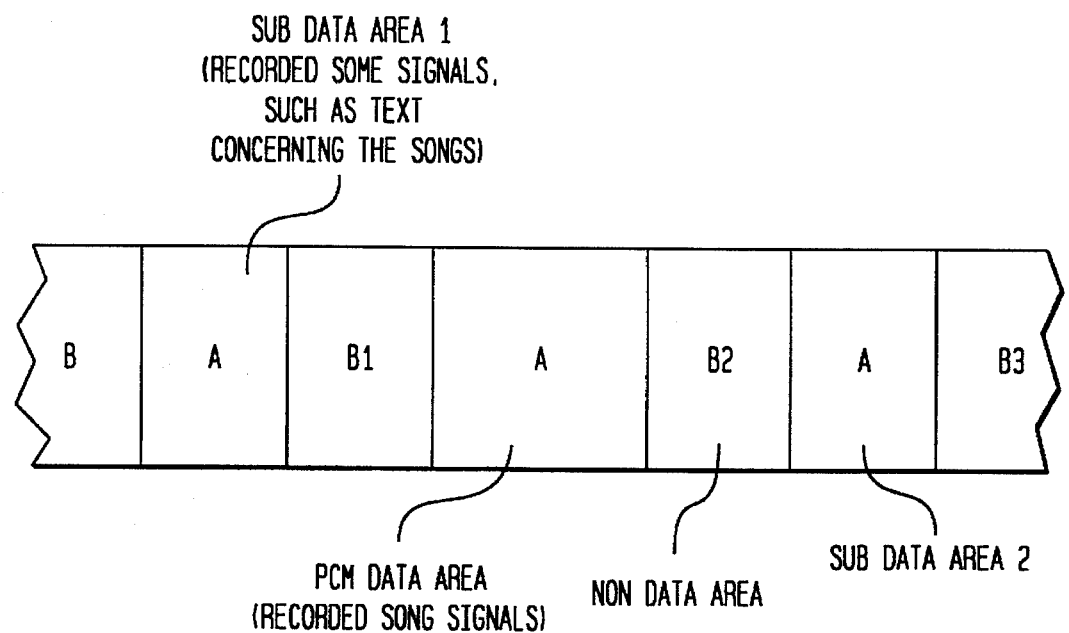
FIG. 4 shows the format on a magnetic track of the present invention.
Figure 5:
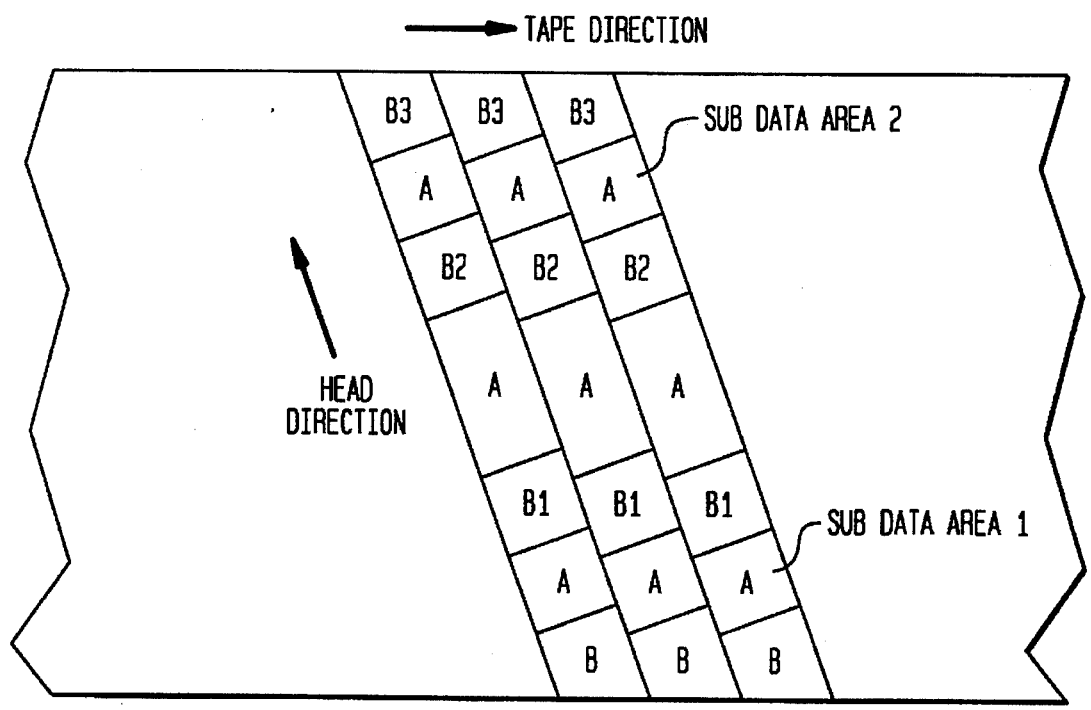
FIG. 5 shows the magnetic recording position on a magnetic track.

As shown in FIG. 4, the present invention is used to determine the magnetic recording head position on a magnetic track which is composed of data area A and non-data area B as shown in FIG. 5. The area ending signals are in turn generated on the positions between subdata area 1 and B1, PCM data area and B2, subdata area 2 and B3. If one would like to overwrite the data recorded on the subdata area, the area ending signals prevent the PCM data area from being overwritten. Contrary to Morisawa's disclosure, the area-ending signals of this invention are generated at the end of a data area for accuracy in determining the position of the magnetic head and fulfilling the overwriting process.

Figure 6:
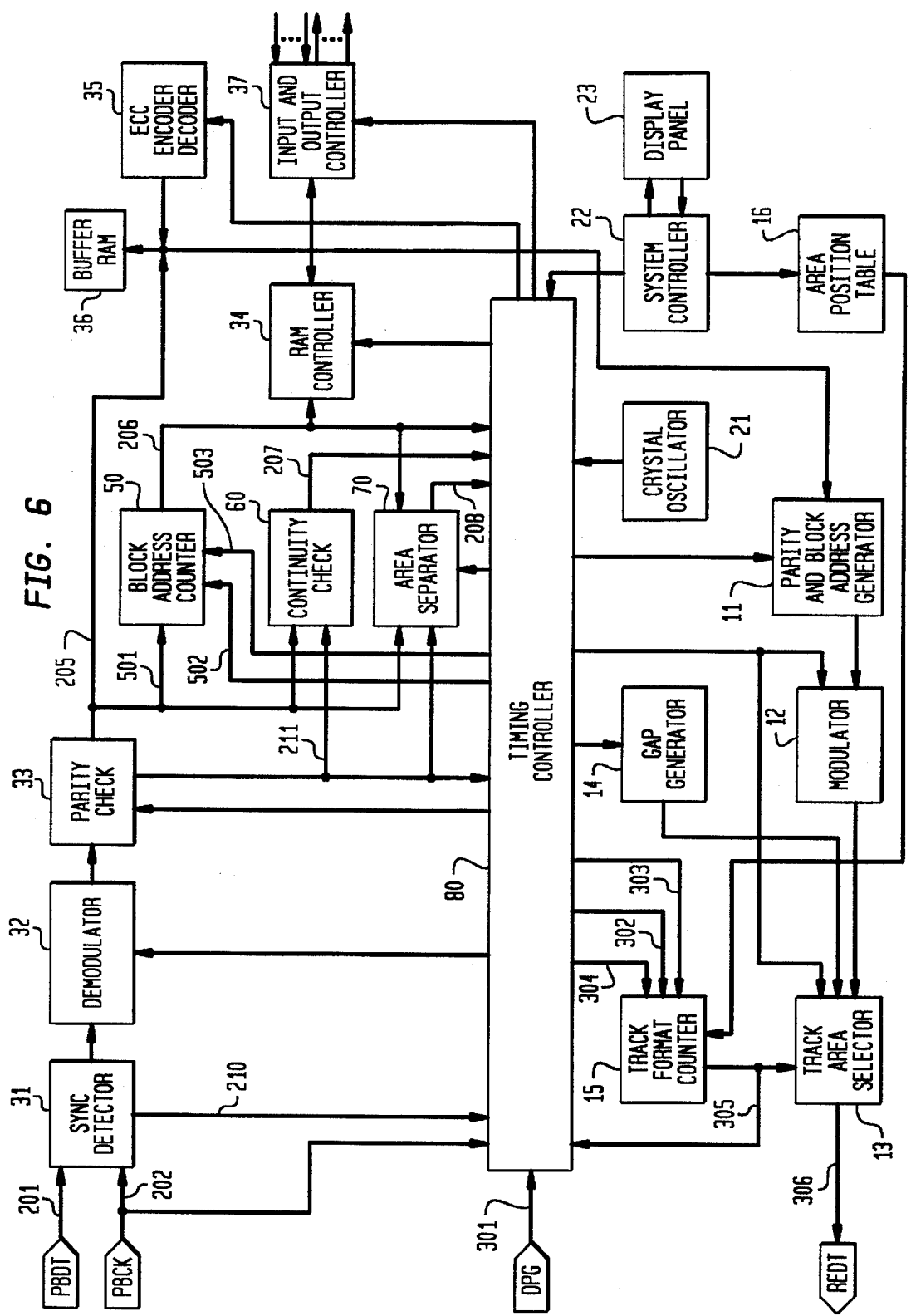
FIG. 6 shows the block diagram for implementing the present invention.
Figure 7:
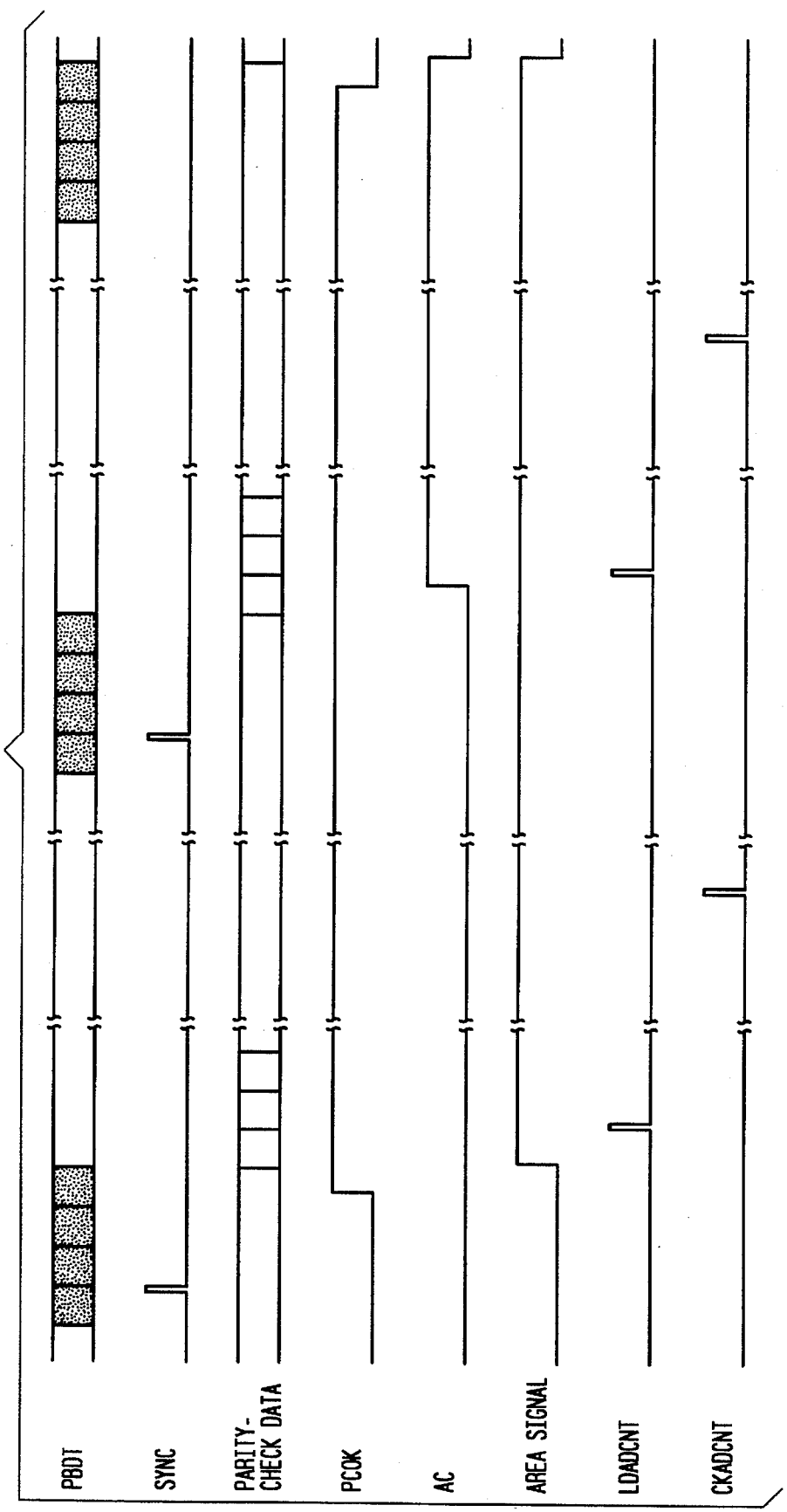
FIG. 7 shows the timing chart of the circuit in FIG. 6.

A practical embodiment of the present invention is shown in FIG. 6. The timing chart for the different signals at various nodes is shown in FIG. 7. During reproducing, the signal on the magnetic tape is reproduced, amplified and conditioned to appear as signal PBDT at line 201. The signal PBCK at terminal 202 is a clock signal derived by a phase locked loop (PLL) from PBDT. SYNC DETECTOR 31 detects whether the PBDT signal has any synchronization signal with the data block. If a synchronization signal is detected, a pulse SYNCDTD appears on line 210 to inform the TIMING CONTROLLER 80 to control DEMODULATOR 32 for demodulating the reproduced data. The PARITY CHECK block 33 is used to check the accuracy of the parity information in the block. For a block which has been initiated, when the TIMING CONTROLLER 80 receives a pulse from the signal SYNCDTD on line 210, this signal is used as a reference to control the timing of the DEMODULATOR 32 and the PARITY CHECK block 33. The result of the parity check is transmitted to the TIMING CONTROLLER 80. If the signal PCOK on line 211 from the PARITY CHECK block is "1", the checked result is correct. If this signal is "0", the result is in error. The function of the CONTINUITY CHECK block 60 is to compare whether the block addresses of two successively reproduced blocks are continuous. During recording, the block address is incremented by one over the previous block address. Utilizing the continuity characteristics of the block address, the CONTINUITY CHECK block 60 adds one more check on the reproduced block address besides the check performed by the PARITY CHECK block 33. Signal AC on line 207 represents the result of the continuity check. Signal AC="1" indicates that the block address of the reproducing block and n previous blocks are continuous, where n is an integer and may be taken as having a value greater than zero. Signal AC="0" indicates otherwise. The BLOCK ADDRESS COUNTER 50 predicts the block address of the reproducing block. If the block address drops out or has random error, an accurate address cannot be obtained from the reproduced signal. For such a condition, the predicted value can now be used for the block address as an interpolated value. The CKADCNT signal on line 502 increments the ADDRESS COUNTER count by one at the end of every block interval. Signal LDADCNT on line 503 is for loading the reliable block address appearing on bus line 501 to the BLOCK ADDRESS COUNTER 50. AREA SEPARATOR 70 is used to generate an area signal corresponding to every area on the magnetic track. An area signal "1" indicates that the corresponding area is being reproduced. Outside this reproducing area, the area signal on line 208 is "0". In this invention, the falling edge of the area signal 208 is controlled by referring to the count value of the BLOCK ADDRESS COUNTER 50, and the block address loaded in the BLOCK ADDRESS COUNTER 50 has been doubly checked for parity and continuity. Therefore, the falling edge of the area signal is quite reliable. RAM CONTROLLER 34 is used for the Read/Write function of the BUFFER RAM 36. After the reproducing block completes the parity check, the reproduced data flows from bus line 205 to the bus line of the BUFFER RAM 36. The RAM CONTROLLER 34 reads the output of the ADDRESS COUNTER 50 to determine the address where the reproduced data should be filled in the BUFFER RAM. ECC ENCODER & DECODER 35 implements the decoding of the error correction code. The decoding action includes reading out data from the buffer RAM 36 for error detection and writing the corrected data back to the BUFFER RAM 36. INPUT & OUTPUT CONTROLLER 37 reads from the BUFFER RAM 36 the decoded data, and sends the data out of the reproducing apparatus.

Figure 1:
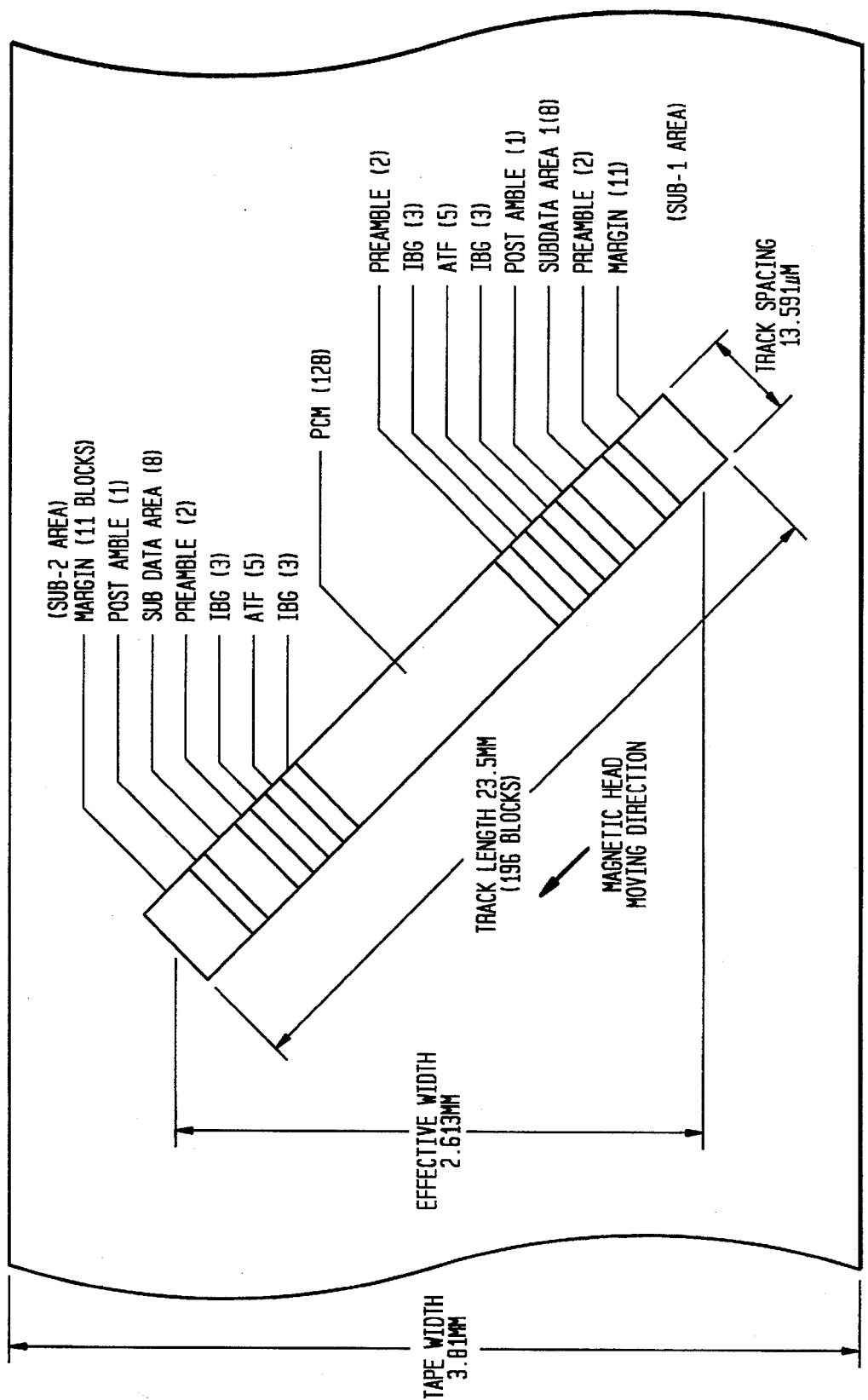
FIG. 1 describes the format of the magnetic tracks in a R-DAT.

During normal recording mode, the pulse on the DPG signal at line 301 from the servo controller reveals the relative position of the magnetic head and the magnetic tape. After some delay, the CLEAR signal on line 302 generates a pulse to inform the TRACK FORMAT COUNTER 15 to clear the count value, and the recording of a track starts at that time. The TRACK FORMAT COUNTER 15 increments the count by one, triggered by the CLOCK signal at line 304 from the TIMING CONTROLLER 80, at the end of every block interval. From the TRACK FORMAT COUNTER 15 value, a select signal on line 305 is produced to inform the TRACK AREA SELECTOR 13 of the area to be recorded. The data on REDT at line 306 is recorded on the magnetic tape through the magnetic head after some signal conditioning like amplification or equalization. The PCM data to be recorded is fed from the INPUT & OUTPUT CONTROLLER and written into the BUFFER RAM. Then, the ECC ENCODER & DECODER encodes the error correction code. The encoding action includes reading out the PCM data from the BUFFER RAM 36 and writing into the BUFFER RAM 36 the encoded parity for error correction. The RAM CONTROLLER 34 reads the output from the TIMING CONTROLLER 80 to determine the address of the data block to be recorded. The encoded data in the BUFFER RAM is read out to the PARITY & BLOCK ADDRESS GENERATOR 11. The function of the PARITY & BLOCK ADDRESS GENERATOR is to add the block address to the data block, and to generate parity bits for the block address and ID code. MODULATOR 12 is used to implement 8-to-10 modulation to convert 8-bit data into 10-bit. The GAP GENERATOR 14 is used to produce gaps between data areas. In an R-DAT, the GAP signals are as shown in FIG. 1 as MARGIN, POSTAMBLE, IBG, ATF, etc. Thus, the TRACK AREA SELECTOR 13, using SELECT SIGNAL on line 305 as a basis, selects the modulation data from the MODULATOR 12 or to produce GAP signals from the GAP GENERATOR, thus constituting the recording contents. The CRYSTAL OSCILLATOR 21 is for producing a system clock for the TIMING CONTROLLER 80.

SYSTEM CONTROLLER 22 determines the system mode from the DISPLAY PANEL block 23, instructs the TIMING CONTROLLER 80 to act according to the system mode, and controls the setting in the AREA POSITION TABLE 16.

In the "after-recording" mode, after the TIMING CONTROLLER 80 detects from the AREA SEPARATOR 70 the falling edge of the AREA SIGNAL 208, a LOAD signal is fed from line 303 to inform the TRACK FORMAT COUNTER 15 to load an output value from the AREA POSITION TABLE 16. The falling edge of the AREA SIGNAL is controlled by the value of the BLOCK ADDRESS COUNTER 50. The block address of the falling edge has been-checked for parity and continuity of the block address, and, hence, has high degree of accuracy. Thus, the falling edge of AREA SIGNAL 208 contains information on the relative positions of the magnetic head and the magnetic track. This signal corrects the setting of the TRACK FORMAT COUNTER, and completes the "after-recording" format.

Figure 8:
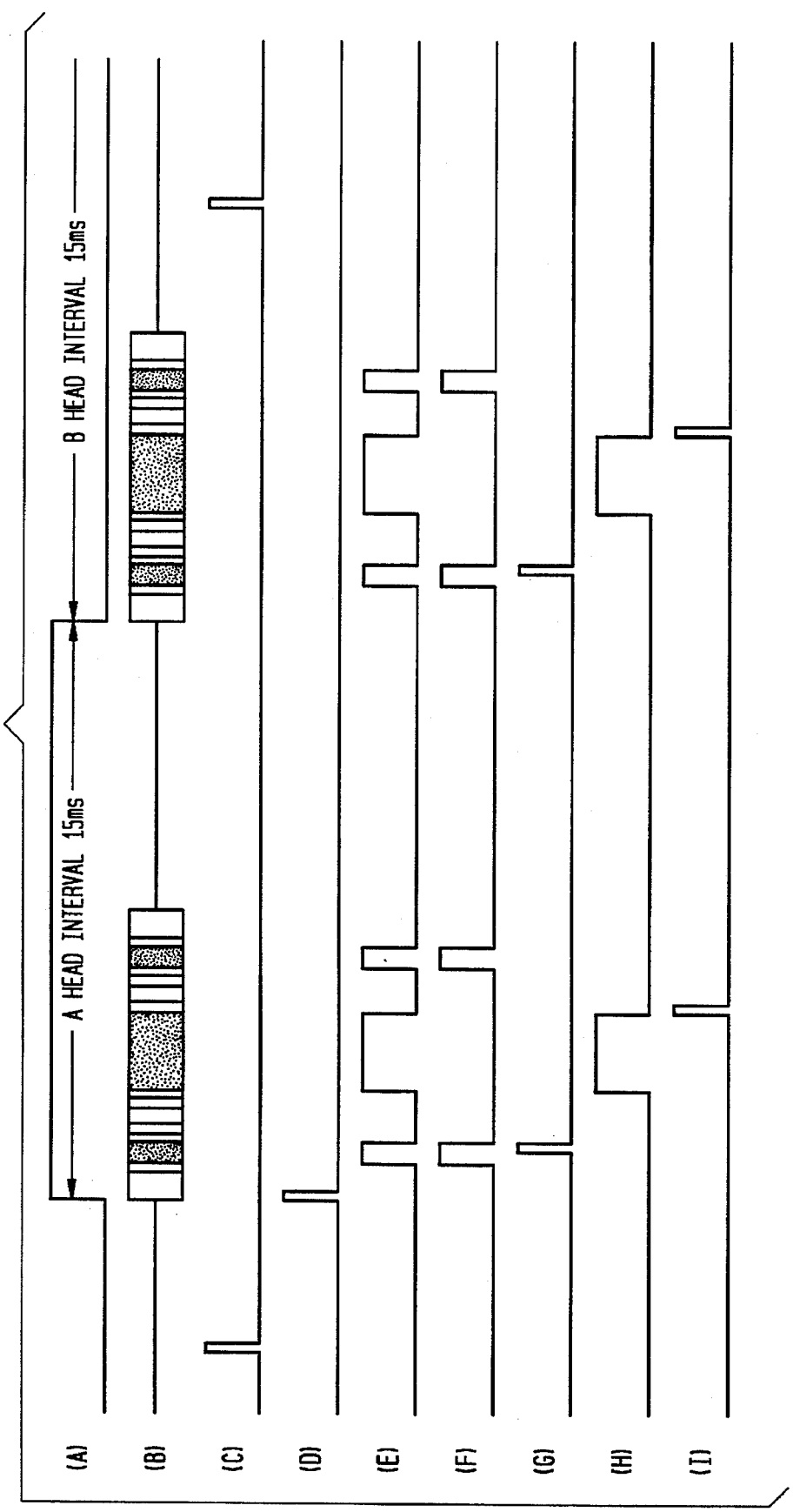
FIG. 8(a)–(i) shows the timing chart of different sequential signals during two head intervals: (a) the head switching signal (HSW); (b) the recording signal; (c) the drum phase generator clock signal (DPG); (d) the CLEAR signal; (e) the area signal in the normal reproducing mode; (f) the area signal during after-recording of the PCM area; (g) the LOAD signal in the normal reproducing mode or during after-recording of the PCM area; (h) the area signal during after-recording of the SUB area; and (i) the LOAD signal during after-recording of the SUB area.
Figure 9:
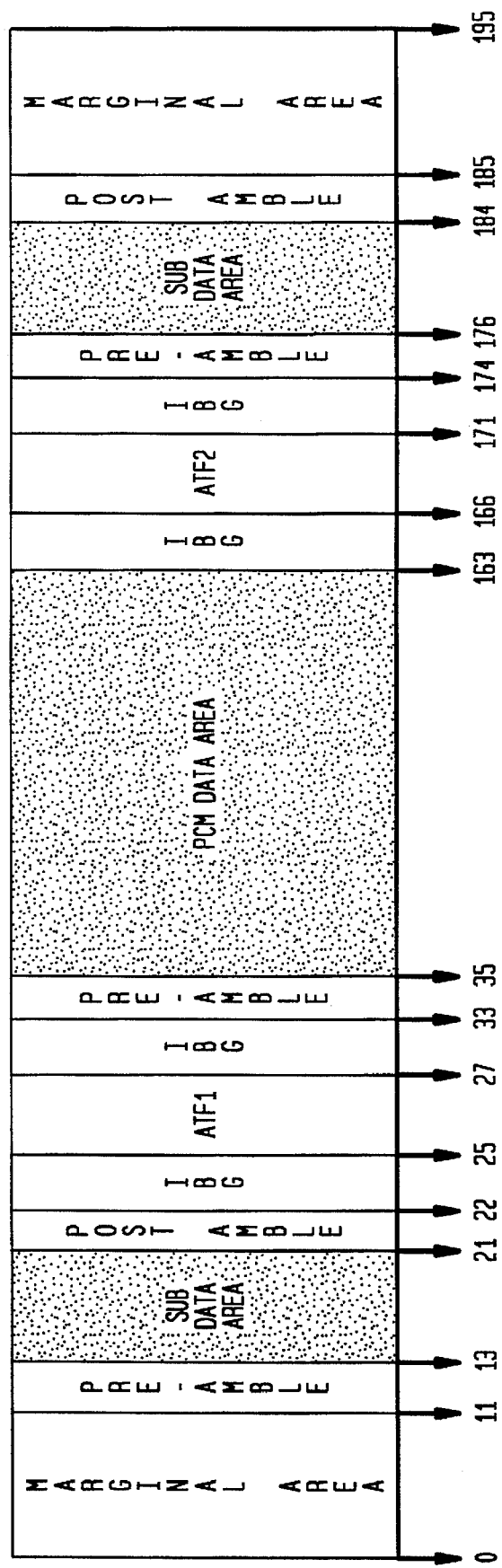
FIG. 9 shows an enlargement of the recording signal of FIG. 8(b) with markers of the track format counter.

In sum, the count value of the TRACK FORMAT COUNTER 15 in FIG. 6 determines the category of signals on REDT at line 306, as is shown in FIG. 8. In the after-recording mode, the accuracy of the counting of the TRACK FORMAT COUNTER 15 is controlled by updating the count value at the falling edges of the area signal of a reproduced data area. Because the accuracy and reliability of the falling edges of the area signals are doubly ensured by parity checking and continuity checking of the reproduced block address, thus the objects of this invention can be achieved. FIG. 8(f,g) shows that during the after-recording of PCM area, a pulse is generated on the LOAD signal at line 303 to load the TRACK FORMAT COUNTER 15 with the value "21" at the falling edge of the area signal of SUB-1 data area. FIG. 8(h,i) shows that during normal reproducing or during after-recording of sub-areas, a pulse is generated on the LOAD signal at line 303 to load the TRACK FORMAT COUNTER 15 with the value "163" at the falling edges of the area signal of PCM area.

What is claimed is:

1. In a system in which data is recorded on a tape by a rotary head in the form of a plurality of recording tracks arranged at oblique angles relative to the tape running direction, a method comprising the steps of:

reproducing a previously-recorded data area of one of the recording tracks, the data area including a plurality of data blocks each having a block address;

determining the block addresses for at least a subset of the plurality of data blocks within the reproduced data area;

generating from the determined block addresses an area signal indicative of the end of the reproduced data area; and using the area signal to determine when the rotary head is properly positioned to record data in a subsequent data area of the same recording track.

2. The method of claim 1 further including the step of performing a parity check on the block addresses used to generate the area signal.

3. The method of claim 1 further including the step of performing a continuity check on the block addresses used to generate the area signal.

4. The method of claim 1 wherein the step of using the area signal to determine when the rotary head is properly positioned further includes the steps of:

using a transition in the area signal to trigger the loading of an area position value into a track format counter;

generating a corresponding select signal in the track format counter; and supplying the select signal to a track area selector which enables the recording of data in the subsequent data area.

5. The method of claim 1 wherein the system is a rotary head digital audio tape (R-DAT) recorder and further wherein the previously-recorded data area is a PCM audio data area and the subsequent data area is a sub data area.

6. The method of claim 1 wherein the system is a rotary head digital audio tape (R-DAT) recorder and further wherein the previously-recorded data area is a sub data area and the subsequent data area is a PCM audio data area.

7. In a system in which data is recorded on a tape by a rotary head in the form of a plurality of recording tracks arranged at oblique angles relative to the tape running direction, an apparatus comprising:

a demodulator connected to receive a reproduced data signal corresponding to a previously-recorded data area of one of the recording tracks, the data area including a plurality of data blocks each having a block address;

a block address counter having an input connected to an output of the demodulator and an output corresponding to a count of the block addresses for at least a subset of the plurality of data blocks within the reproduced data area;

an area separator having an input connected to the output of the block address counter and an output corresponding to an area signal indicative of the end of the reproduced data area; and a controller having an input connected to an output of the area separator and an output corresponding to a signal indicative of when the rotary head is properly positioned to record data in a subsequent data area of the same recording track.

8. The apparatus of claim 7 further including a parity check circuit having an input connected to the demodulator output and an output indicative of whether the block addresses applied to the block address counter have proper parity.

9. The apparatus of claim 7 further including a continuity check circuit having an input connected to the demodulator output and an output indicative of whether the block addresses applied to the block address counter have proper continuity.

10. The apparatus of claim 7 wherein the controller further includes a timing controller in which a transition in the area signal triggers the generation of a load signal at the output thereof.

11. The apparatus of claim 10 further including:

a track format counter having an input connected to the output of the timing controller to receive the load signal therefrom and an output corresponding to a select signal; and a track area selector having an input connected to the output of the track format counter and an output which enables the recording of data in the subsequent data area.

12. The apparatus of claim 7 wherein the system is a rotary head digital audio tape (R-DAT) recorder and further wherein the previously-recorded data area is a PCM audio data area and the subsequent data area is a sub data area.

13. The apparatus of claim 7 wherein the system is a rotary head digital audio tape (R-DAT) recorder and further wherein the previously-recorded data area is a sub data area and the subsequent data area is a PCM audio data area.

* * * * *